United States Patent [19]

Kulterman et al.

[11] 4,401,931
[45] Aug. 30, 1983

[54] APPARATUS ACTUATED BY A PAIR OF STEPPER MOTORS WITH SHARED DRIVE

[75] Inventors: Robert W. Kulterman, Austin; James M. Rakes, Leander; Robert H. Sweat, Jr., Round Rock all of Tex.

[73] Assignee: International Business Machines Corporation, Armonk, N.Y.

[21] Appl. No.: 214,070

[22] Filed: Dec. 8, 1980

[51] Int. Cl.³ .......................................... H02K 37/00
[52] U.S. Cl. .................................. 318/696; 318/685; 318/103
[58] Field of Search ................ 318/51, 113, 601, 603, 318/696, 103

[56] References Cited

U.S. PATENT DOCUMENTS

| | | | |
|---|---|---|---|
| 3,268,785 | 8/1966 | Gerber et al. | 318/8 |
| 3,374,873 | 3/1968 | Takenaka | 197/49 |
| 3,416,053 | 12/1968 | Inaba et al. | |
| 3,416,054 | 12/1968 | Galles | 318/138 |
| 3,426,259 | 2/1969 | Ziehm | 318/102 |
| 3,486,093 | 12/1969 | McArthur | 318/102 |
| 3,586,953 | 6/1971 | Markkanen et al. | 318/685 |
| 3,816,656 | 6/1974 | Ludwig | 178/34 |
| 3,967,179 | 6/1976 | Loyzim | 318/696 |
| 3,983,468 | 9/1976 | Maitrias | |
| 4,006,395 | 2/1977 | Reesen | 318/685 |
| 4,039,067 | 8/1977 | Kashio | 197/49 |
| 4,055,786 | 10/1977 | DiMarzio | 318/562 |
| 4,131,840 | 12/1978 | Wiesner | 318/685 |
| 4,224,559 | 7/1982 | Miller | 318/601 |
| 4,289,997 | 7/1981 | Jung et al. | 318/113 |

Primary Examiner—J. V. Truhe
Assistant Examiner—Saul M. Bergmann
Attorney, Agent, or Firm—J. B. Kraft

[57] ABSTRACT

In apparatus which uses a plurality of stepper motors for the actuation of various moving members therein, e.g., impact printer apparatus, an expedient is provided wherein at least one pair of stepper motors which operate during mutually exclusive periods share common driver means which are switchable to be connected to the active stepper motor and disconnected from the dormant one. When thus connected to the active stepper motor, the driver means operate in the conventional manner to couple the windings of the active stepper motor to the particular current supply associated with that active motor in a predetermined sequence so that each winding of the active motor is energized during portions of the sequence and deenergized during other portions. The apparatus further includes switching means for selectively connecting and disconnecting the drive means to the first and second stepper motors in accordance with the requirements of the apparatus driven by said stepper motors.

6 Claims, 3 Drawing Figures

APPARATUS ACTUATED BY A PAIR OF STEPPER MOTORS WITH SHARED DRIVE

DESCRIPTION

BACKGROUND OF THE INVENTION

1. Field of the Invention

This invention relates to control systems for plurality of stepper motors, and more specifically, stepper motor control systems for plural stepper motors wherein operating hardware and consequently cost of the control system is minimized.

2. Description of the Prior Art

Stepper motors are extensively used in a wide variety of equipment ranging from transport vehicles to manufacturing apparatus to printing apparatus. In the traditional and most straightforward operation of stepper motors, each motor has associated therewith a controller which determines the mode of operation of the stepper motor, i.e., the current characteristics to be provided to the windings of the stepper motor as well as the driving of the stepper motor which involves the sequence in which the plurality of windings in the stepper motor are energized by being respectively connected and disconnected to a current supply which provides the above-mentioned current of predetermined characteristic to the energized windings of the motor.

The art has recognized that with apparatus employing a plurality of stepper motors and particularly stepper motors which operate during operational cycles mutually exclusive of each other, if two or more of such stepper motors shared a single controller, then considerable savings could be achieved through the elimination of duplicate controllers. U.S. Pat. No. 4,055,786 discloses such a stepper motor control system wherein two or more stepper motors share a single controller system. While such a shared controller system for a plurality of stepper motors did provide some valuable savings, these applications where limited to stepper motors which operated in substantially the same mode, i.e., all of the plurality of the stepper motors have to operate in an open loop mode or all had to operate in a closed loop mode. Also, all of the stepper motors had to utilize energizing currents of substantially the same characteristics.

Thus, apparatus with shared controllers could not be used for the operation of stepper motors which operated in different modes or had significantly different energizing current characteristics.

BRIEF DESCRIPTION OF THE PRESENT INVENTION

It is a primary object of the present invention to provide a multi-stepper motor control and drive system having a minimum of components and consequently of low cost.

It is a further object of the present invention to provide such a low cost minimum component multi-stepper motor control and drive system which is capable of operating the individual stepper motors in a plurality of different modes.

The present invention provides stepper motor control apparatus wherein a plurality of stepper motors each with its own control system share a common drive means which is switchable to operate in combination with one of the stepper motors and its associated control system during a first time period and then to operate with the other stepper motor and its associated control system during a second time period. In this manner, apparatus cost is substantially reduced by eliminating the need for an individual drive for each of the stepper motors. For example, in a printer apparatus application, if two of the stepper motors used in the impact printer share a common drive in accordance with the present invention, savings in the order of $25 per printer may be realized.

It should be noted that since each of the stepper motors still has an individual control system, each stepper motor can still function in a different mode, i.e., one of the stepper motors can operate in an open loop mode while a second stepper motor may operate in a closed loop mode.

More specifically, the present invention provides a stepper motor drive apparatus comprising a first multiphase stepper motor having a plurality of windings and a second multiphase stepper motor having a plurality of windings, first supply means for providing an energizing current of individualized predetermined characteristics to the windings of the first stepper motor, and second supply means for providing an energizing current of individualized predetermined characteristics to the windings of the second stepper motor and driver means shared by the first and second stepper motors and switchable to be connected to one of said motors and disconnected from the other. The driver means when connected to one of said stepper motors operates the windings of this stepper motor which are coupled to the current supply means to regulate the current supply means in a predetermined sequence so that each winding of the connected stepper motors is energized during portions of the sequence and deenergized during other portions of the sequence. With such a structure, one of the current supply means may further include means for sensing the current levels in the energized windings of the operational stepper motor and means responsive to such said levels for varying the energizing current. In this manner, this stepper motor will be operable in a controlled current mode while one of the other stepper motors may or may not include any current sensing means and thus operates in an uncontrolled current mode. With such a structure, one of the controller means may further include means for sensing stepper motor shaft position or stepper motor shaft velocity and means responsive to such said position or velocity to vary the energization of motor phases in a controlled manner. In this manner, said stepper motor will be operable in a closed loop mode, while one of the other stepper motors may or may not include any position or velocity sensing means and thus will be operable in an open loop mode.

BRIEF DESCRIPTION OF THE DRAWINGS

Referring now to the drawings, wherein a preferred embodiment of the invention is illustrated, and wherein like reference numerals are used throughout to designate like parts.

DETAILED DESCRIPTION OF THE PREFERRED EMBODIMENT

Figure 1:
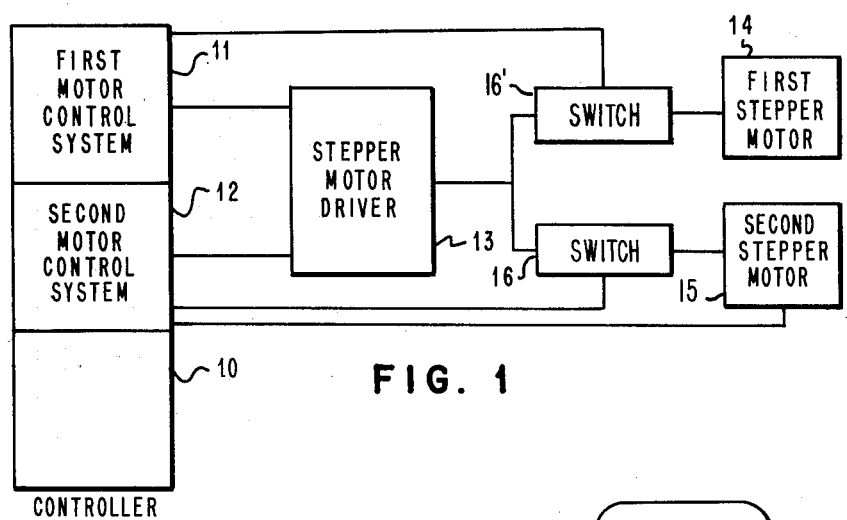
FIG. 1 is a generalized logic diagram showing the major logic blocks of the present invention.

FIG. 1 shows generalized view of the logic used to carry out the principles of the present invention. Controller 10 which may be any conventional CPU, preferably a microprocessor, containing a control system 11 for a first stepper motor and a control system 12 for a second stepper motor. A single stepper motor driver 13 is connected to first stepper motor control system 11 and second stepper motor control system 12 which share this driver. Stepper motor driver 13 is alternatively connected to first stepper motor 14 and second stepper motor 15 through switching means 16 and 16' which function to switch respectively first stepper motor 14 into connection with driver 13 when driver 13 is under the control of first stepper motor control system 11, or to connect second stepper 15 with stepper motor driver 13 when stepper motor driver 13 is under the control of second stepper motor control system 12. When stepper motor driver 13 is switched into connection with one of the stepper motors, it operates to couple the windings of the connected stepper motor to current supply means for that stepper motor in a predetermined sequence so that each winding of the stepper motor is energized during portions of the sequence and deenergized during other portions of the sequence. This operation will be described in greater detail hereinafter with respect to FIG. 2. Switches 16' and 16 are activated respectively by first motor control system and second motor control system. Furthermore a position feedback loop is connected from the second stepper motor to the second motor control system.

A specific embodiment of the present invention will now be described as an application of the general system shown in FIG. 1 with respect to a pair of stepper motors used in an impact printer. Impact printers such as the type described in U.S. Pat. Nos. 4,044,880, 4,189,246 and 4,178,108 employ a plurality of stepper motors. The printers employ a stepper motor to drive the print wheels which are rotated to bring the selected character into position. Another stepper motor is used to index the document being printed upon to the next printing line when necessary. In the embodiment shown in FIG. 2, a pair of stepper motors are controlled by the system of the present invention. The stepper motors must operate during mutually exclusive periods. Consequently, the present invention is applicable to controlling both the stepper motor which rotates the print wheel to bring the selected character into position and the stepper motor which indexes the document being printed upon since document indexing and character selection are carried out during mutually exclusive periods. Thus, the two stepper motors involved are never required to operate at the same time.

Figure 2:
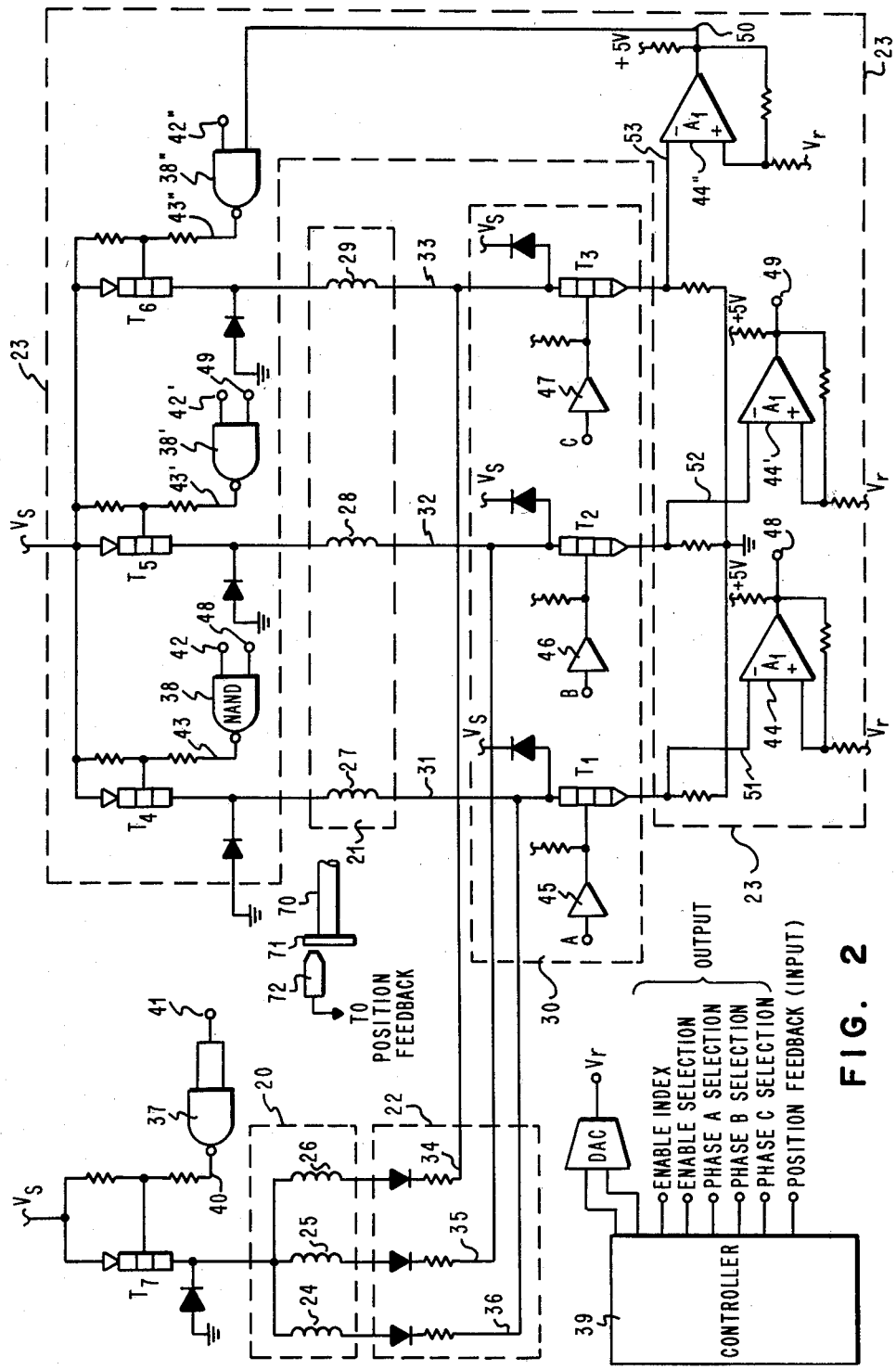
FIG. 2 is a schematic circuit diagram of one application of the logic shown in FIG. 1.

Now with reference to FIG. 2, multiphase stepper motor 20 which functions to index the document in an impact printer and multiphase stepper motor 21 which is used to drive the character print wheel during the character selection operation in the printer are controlled by the system of the present invention. As will be described hereinafter in greater detail, each of the stepper motors 20 and 21 is respectively connected with a voltage source $V_s$ through respective current regulating means 22 and 23 which respectively provide a first energizing current of predetermined characteristics to the windings 24, 25 and 26 of the index stepper motor 20 and windings 27, 28 and 29 of the character select wheel stepper motor 21. Both stepper motors 21 and 20 share stepper motor driver circuits 30 which have three drive transistors T1, T2 and T3 respectively coupled to windings 27, 28 and 29 of selection stepper motor 21 by means of connectors 31, 32 and 33 as well as to windings 24, 25 and 26 of index stepper motor 20 through connectors 34, 35 and 36. The circuit of FIG. 2 further includes switching means for respectively switching stepper motor driver circuit 30 into electrically operative association with either index stepper motor 20 or select stepper motor 21. These switch means include index enable gate 37 and select enable gates 38, 38' and 38''. If index stepper motor 20 is to be disconnected from driver means 30 and select stepper motor 21 connected with driver means 30, then an inhibit (low) output from the enable index terminal of controller 39 is applied to input terminal 41 of enable gate 37 (functioning as an inverter) which in turn raises line 40 to turn off current control transistor T7 which in turn disconnects index motor 20 and its current control means 22 from voltage source $V_s$.

On the other hand, the enable select terminal of controller 39 applies a high signal to terminals 42, 42' and 42'' to respectively enable gates 38, 38' and 38''. This sets these three enable gates so that whichever gate receives a coincident high signal on its respective other terminal 48, 49, or 50, that gate will provide a low signal on its respective output line 43, 43' or 43'' which will turn its associated current control transistor on to connect voltage source $V_s$ for energizing windings 27, 28, or 29. Consequently, stepper motor 21 is the operative or active stepper motor which utilizes stepper motor drive circuit 30. In this operational arrangement, controller 39 will then provide a predetermined sequence of output signals on its phase A select, phase B select and phase C select output terminals which are in turn respectively applied to phase select input terminals A, B, and C of driver 30 in said predetermined sequence to respectively provide through amplifiers 45, 46 and 47 the signals which sequentially drive transistors T1, T2 and T3 to in turn respectively energize windings 27, 28 and 29 of operational stepper motor 21 in said predetermined phase sequence.

It should be noted that stepper motor 21 operates in a current controlled mode. By current controlled mode, we broadly mean that current through the energized windings of the stepper motor is sensed and fed back to the control system which in turn modifies the current supply. The current sensing means include comparators 44, 44' and 44'' respectively associated with each of windings 27, 28 and 29 of stepper motor 21 by input to these comparators through connectors 51, 52 and 53. The comparator associated with the turned-on drive transistor T1, T2 and T3 will determine the current in the associated energized winding of motor 21 by comparing the voltage level at the emitter of either transistor T1, T2 or T3 with the predetermined selected voltage level $V_r$. So long as the sensed voltage remains below the predetermined level $V_r$, the output of the comparators 44, 44' or 44'' will remain high. Consequently, the inputs 48, 49 and 50 will be high and the outputs from enable gates 38, 38' and 38'' on lines 43, 43' and 43'' will be low and control transistors T4, T5 and T6 will be conductive.

When the sensed voltage at the transistor emitter reaches a predetermined level, the comparator 44, 44' or 44'' associated with the selected driver T1, T2, or T3 will provide an inhibit (low) output on its respective output line 48, 49 or 50 to its associated enable gate, 38, 38' or 38" to provide an inhibit (high) pulse on the associated enable gate output line 43, 43' or 43" which in turn will turn off the respective current control transistor T4, T5 or T6 associated with the energized winding 27, 28 or 29. This will cause the current in the energized winding to drop which in turn will drop the voltage at the emitter of the drive transistor T1, T2 or T3 associated with the energized winding. This will produce a voltage level on either connector 51, 52 or 53 which will fall below the predetermined level of the comparator 44, 44' or 44" which in turn will remove the inhibit output from either line 43, 43' or 43" and will turn the associated current control transistor T4, T5 or T6 on again. This in turn will increase the current level in the energized coil 27, 28 or 29. With this type of chopper arrangement for current control based upon feedback, the current level in an energized winding, 27, 28 or 29 of selection motor 21 may be controlled.

By the switching expedient of the present invention, stepper motor driver circuit 30, which has just operated in combination with the current control system associated with select stepper motor 21 may now be used in connection with the index motor 20 and control system 22 which does not sense current. This is accomplished by removing the inhibit (low) signal from enable gate 37, providing an inhibit (low) output signal from controller 39 on its enable select terminal and applying its inhibit select (low) signal to input terminals 42, 42' and 42" to in turn cause enable gates 38, 38' and 38" to provide high output signals on lines 43, 43' and 43" which will turn all three control transistors T4, T5 and T6 of the select motor current control means off. This will inactivate select motor 21.

On the other hand, since enable gate 37 associated with index stepper motor 20 produces a low signal on line 40, transistor T7 will be rendered conductive to thereby connect windings 24, 25 and 26 of index stepper motor 20 to voltage source $V_s$. It then follows, when the previously described sequence of phase A, B and C output signals are applied from controller 39 to phase select input terminals A, B and C of drive circuit 30, then drive transistors T1, T2 and T3 will drive coils 24, 25 and 26 in a predetermined phase sequence.

Figure 3:
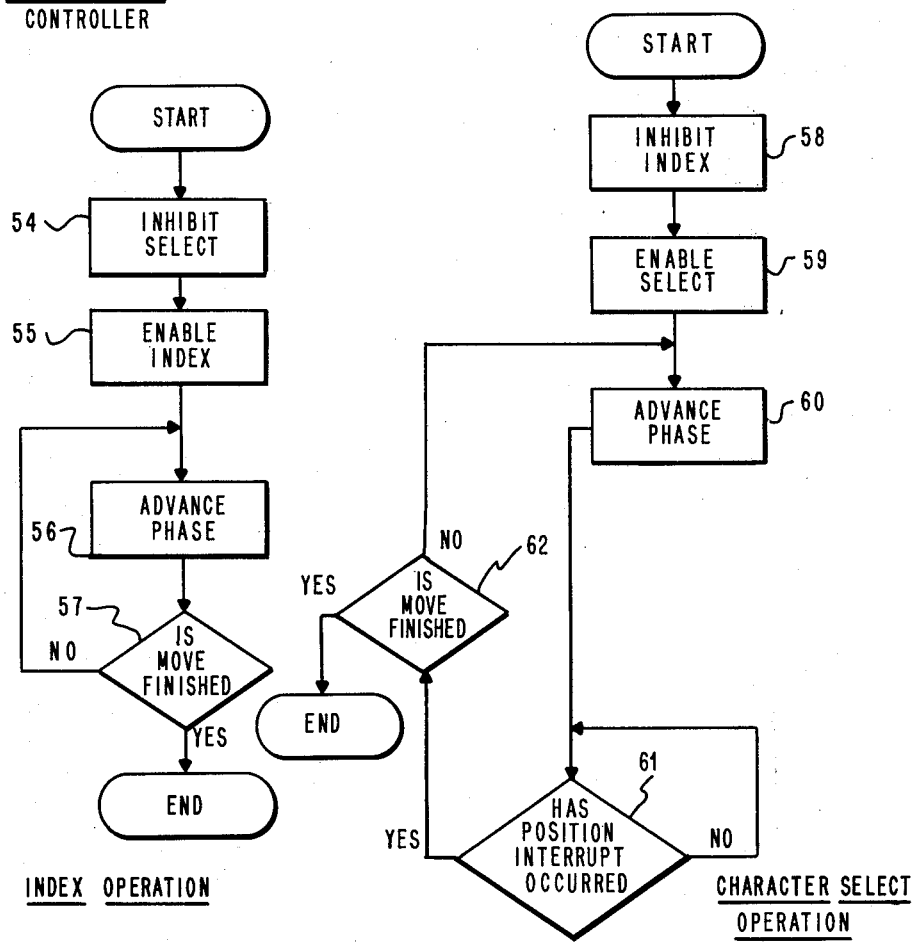
FIG. 3 is a flow chart of a series of control steps being carried out with the circuit shown in FIG. 2.

The operation of the index stepper motor 20 and the operation of the selection stepper motor 21 during mutually exclusive periods will now be described with reference to the flow charts of FIG. 3. During the steps described in the flow charts of FIG. 3, the circuit element of FIG. 2 will function in the manner described hereinabove. For purposes of this description, we will describe an operation wherein index stepper motor 20 is operated without positional feedback, i.e., open loop. In open loop control the phases of a stepper motor are advanced in a predetermined chronological sequence based upon time intervals without any feedback indicating whether the stepper motor has reached a particular position. On the other hand, selection stepper motor 21 will be operated with positional feedback in a closed loop control mode, i.e., the angular rotational position of the stepper motor shaft is sensed and fed back to the controller 39 which proceeds with the phase advance in response to such positional feedback. For purposes of illustration, we have diagrammatically shown in FIG. 2 a shaft 70 which has been broken off but will be understood to extend from and function as the rotating shaft of stepper motor 21. As is conventional in positional sensing, shaft 70 contains a disk 71 containing regularly spaced indicia which may be either optically or magnetically sensed. Transducer or encoder means 72 which are conventional in structure and capable of sensing such optical or magnetic indicia provide a positional feedback to the feedback input terminal of controller 39. When the feedback pulses to controller 39 reach a predetermined number, controller then determines that a position interrupt has occurred and then advances the phase of stepper motor 21 to the next phase.

This operation will now be described in connection with the character select operation set forth in the flow charts of FIG. 3. The first step in the sequence under control of the control system in processor 39 will be to inhibit the index motor, block 58 in FIG. 3. Then, microprocessor 39 will provide a signal, block 59, to enable select stepper motor 21. With stepper motor 21 thus enabled and switched into operative relationship with the shared stepper motor driver circuit, the microprocessor 39 will put out a series of commands on phase select terminals A, B and C to phase select input terminals A, B and C in stepper motor driver circuit 30 which will selectively energize and deenergize stepper motor windings 27-29 to advance the phases, block 60. At this point, block 61, controller 39 first determines whether or not it has received sufficient feedback count indicating that the position has been reached in the rotation of the stepper motor whereat phases should be changed (position interrupt). If this has not occurred, the operation continues to loop back to decision block 61 until feedback from stepper motor shaft 70 to controller 39 indicates that position for a phase change has been reached. At this point, block 62, a determination is made as to whether the selection move is complete. If it is, the selection operation is ended. If the microprocessor or controller 39 determines that the selection move is not complete, then, the operation is looped back to advance phase, block 60, and the controller 39 energizes one of stepper motor phases 27, 28, or 29 for the next stepper motor advance. This is continued until the move is finished, block 62.

In the index motor operation, when microprocessor 39 institutes the procedure, selection motor 21 is inhibited, block 54, as previously described. Then, index motor 20 is enabled, block 55. At this point, only stepper motor 20 is electrically connected to stepper motor driver circuit 30. Next, the phases are advanced, block 56, through a series of signals output on the phase select terminals of microprocessor controller 39 to driver circuit 30 which selectively energize and deenergize windings 24-26 of stepper motor 20. Next, in block 57, a determination is made as to whether the total index move is complete. If it is complete, the operation is ended. If it is not complete, the operation is looped back to advance phase, block 56, and repeated.

The specific examples set forth show how a pair of stepper motors with completely different current control circuits and with different operating modes share a common stepper motor driver circuit. It will be clear that other combinations of two or more stepper motors may be operated so as to share a common driver circuit while each of the stepper motors maintain independent current control circuits.

While the invention has been particularly shown and described with reference to a preferred embodiment it will be understood by those skilled in the art that various other changes in form and detail may be made without departing from the spirit and scope of the invention.

What is claimed is:

1. Stepper motor control apparatus comprising
a first stepper motor,
a first control system for operating said first stepper motor in an open loop mode,
a second stepper motor,
a second control system for operating said second stepper motor in a closed loop mode, and
stepper motor driving means responsive to said first control system for driving said first stepper motor and responsive to said second control system for driving said second stepper motor.

2. Stepper motor drive apparatus comprising
a first multiphase stepper motor having a plurality of windings,
a second multiphase stepper motor having a plurality of windings,
first supply means for providing an energizing current of predetermined characteristics to the windings of said first stepper motor,
second suppy means for providing an energizing current of predetermined characteristics to the windings of said second stepper motor,
driver means shared by said first and second stepper motors and switchable to be connected with one of said motors and disconnected with the other, said driver means when connected to said one stepper motor operating to couple the windings of said connected stepper motor to said current supply means for said motor in a predetermined sequence so that each winding of said one stepper motor is energized during portions of said sequence and deenergized during other portions of said sequence, and
switching means for selectively connecting and disconnecting said driver means to said first and second stepper motors.

3. The stepper motor drive apparatus of claim 2 wherein
said first current supply means further includes
means for sensing the current levels in the energized windings of said first stepper motor, and
means responsive to said sensed levels for varying said energizing current.

4. The stepper motor drive apparatus of claim 3 wherein said second current supply means does not respond to sensed winding current levels.

5. In a printer having a first stepper motor for driving a character selection member and a second stepper motor for driving document indexing means, said stepper motors being operable during mutually exclusive time periods, the improvement wherein said printer further includes,
first control means for operating said first stepper motor in a first mode,
a second control means for operating said second stepper motor in a second mode, and
stepper motor driving means responsive to said first control means for driving said first stepper motor and responsive to said second control means for driving said second stepper motor.

6. The printer of claim 5 wherein said first stepper motor operates in a closed loop mode and said second stepper motor operates in an open loop mode.

* * * * *